United States Patent [19]
Schmidt

[11] 4,308,533
[45] Dec. 29, 1981

[54] DISPLAY ELEMENT HAVING IMPROVED SPACING AND THROUGH-CONNECTING OF PLANE-PARALLEL ELECTRODE PLATES, AND METHOD OF MAKING

[75] Inventor: Walter Schmidt, Lenzburg, Switzerland

[73] Assignee: BBC Brown, Boveri & Company, Ltd., Baden, Switzerland

[21] Appl. No.: 76,672

[22] Filed: Sep. 18, 1979

[30] Foreign Application Priority Data

Oct. 27, 1978 [CH] Switzerland ............... 11108/78

[51] Int. Cl.³ ................................... G06F 3/14
[52] U.S. Cl. ......................... 340/784; 350/343; 340/700; 340/366 E
[58] Field of Search ............... 350/343, 344, 334; 340/784, 700, 782, 366 E

[56] References Cited

U.S. PATENT DOCUMENTS

| 3,771,855 | 11/1973 | Burns | 350/344 |
|---|---|---|---|
| 3,940,756 | 2/1976 | Findlay | 340/782 |
| 4,078,855 | 3/1978 | Fujita et al. | 350/343 |
| 4,142,780 | 3/1979 | Sasaki et al. | 350/334 |
| 4,165,157 | 8/1979 | Kobale et al. | 350/344 |
| 4,202,606 | 5/1980 | Wild | 350/343 |
| 4,217,035 | 8/1980 | Doriguzzi et al. | 350/344 |

FOREIGN PATENT DOCUMENTS

| 2406623 | 9/1974 | Fed. Rep. of Germany | 340/784 |
|---|---|---|---|
| 2555822 | 3/1977 | Fed. Rep. of Germany | 340/784 |
| 584949 | 2/1977 | Switzerland | 340/784 |

Primary Examiner—Marshall M. Curtis
Attorney, Agent, or Firm—Oblon, Fisher, Spivak, McClelland & Maier

[57] ABSTRACT

A display element formed by two parallel glass plates each having opposed electrodes provided thereon and an optical medium disposed in the intermediate space therebetween, wherein a connection between at least one electrode of one plate and at least one electrode of another plate, and the interplate spacing is achieved by means of electrically conducting fibers each having the same constant diameter disposed between the plates around the periphery thereof, with the conductive fibers contacting the respective electrodes formed on the display plates and thereby electrically connecting the same. The spacing for the display element is derived by mixing the conductive fibers in an adhesive compound to form a cement ridge around the periphery of the plates and applying the compound containing the conductive fibers to at least one of the plates, and then pressing the plates together until the plates are separated by a distance corresponding to the diameter of the conductive fibers.

2 Claims, 4 Drawing Figures

DISPLAY ELEMENT HAVING IMPROVED SPACING AND THROUGH-CONNECTING OF PLANE-PARALLEL ELECTRODE PLATES, AND METHOD OF MAKING

BACKGROUND OF THE INVENTION

1. Field of the Invention

This invention relates to a display element formed by a pair of parallel glass plates each having opposed electrodes formed thereon, and more particularly to a spacer for separating the plates by a predetermined distance and for making electrical connection between the parallel plates. The invention further relates to a method of producing a display element.

2. Description of the Prior Art

As is known, both luminescent and non-luminescent display elements are used today for representing information. The basic structure of various such types of display elements which work in accordance with different principles, consists of two plates arranged parallel to one another at a certain distance and covered partially with electrically conductive electrodes which are matched functionally to the information to be displayed. The type of display elements mentioned includes liquid crystal displays of different types, i.e. electrochromatic, electrophoretic and ferroelectric display elements, these types of display elements being represented in greater detail in the book "Nonemissive Electrooptic Displays" by A. R. Kmetz and F. K. von Willisen, Plenum Press 1976, page 201 et seq. Another common characteristic of the different types of display elements mentioned, which may be noted, is that the electrodes of both plates are connected electrically to a voltage or current source by which the information to be represented is made visible by driving opposed electrodes of the display element in the appropriate manner.

All these display elements also have the common feature that the plates forming their boundaries, mostly glass plates, have to be held at a certain distance from one another which corresponds in an optimum manner to the function of the display. This distance can be a few micrometers up to several hundred micrometers.

The thickness of the intermediate space formed by the two plates is of decisive significance for the operation, but especially also for the optical and electric quality and the service life of a display unit. For this reason it is desirable that this thickness deviates as little as possible from the nominal thickness over the whole area of a display unit as well as from display unit to display unit within a production run. As is known, the intermediate space formed by the two plates is closed off hermetically to the outside by cementing the peripheral plate edges together with an electrically insulating cement, approximately according to Swiss Patent 584,949. Due to the previously stated reasons, this cement ridge must have a thickness which is as uniform as possible and equal to the nominal thickness of the intermediate space, and there are no indications to this effect in the state of the art mentioned.

A certain improvement in accuracy can be achieved according to German Offenlegungsschrift No. 2,406,623 wherein mechanically stable particles, the diameter of which corresponds to the optimum distance between plates, is admixed to the cement or sealing compound. According to the process described in German Offenlegungsschrift No. 2,406,623, the plates are pressed together by suitable devices during the cementing process, the cement being in a liquid state, until they come to rest on the admixed particles and thus a minimum distance is guaranteed. This process has the disadvantage, however, that it is not possible to produce powders of an infinitely narrow particle size distribution resulting in a more or less wide spread in the plate spacing.

For this reason, as is known, for example, from U.S. Pat. No. 4,217,035, methods have been developed in which the powder is replaced by short pieces of glass fibers. Glass fibers have an exactly defined diameter and are better suited for producing display elements with tight thickness tolerances. In addition they are mechanically more stable due to their relatively long support line. The problem of obtaining an adequately accurate and constant distance between the plates could be solved with glass fibers, but unfortunately they simultaneously stand in the way of the solution to the following, very important problem.

As has been mentioned before, for operating a display device both the front and the back electrode must be provided with electric contacts.

This could be managed by bringing the corresponding electrode tracks out laterally on externally accessible plate areas which, however, is firstly very cumbersome and costly and, secondly, not always possible.

Thus it is extremely desirable, if not a necessity with respect to the application, that all the contact connections of the display element are located in one plane, that is the contact connections of, for example, the back electrode must also be conducted via an electrically conductive bridge to the plane of the contact tracks of the front electrode.

This electrically conductive bridge between the two electrodes can be produced, as for example in the said Swiss Pat. No. 584,949 or in German Offenlegungsschrift No. 2,555,822, by applying one or several contact points of conductive silver, conductive epoxy or a glass containing silver in the case of plates with glass-to-glass seals. In addition, attempts have been made to mix conductive powders such as small metal beads, graphite powder or also semi-conductive silicon carbide in with the cement itself. None of these methods, however, have brought the desired success since these electrically conductive powders have the same disadvantages as the solid particles already known for limiting the plate spacing from German Offenlegungsschrift No. 2,406,623. In addition, metallic powders in the appropriate fineness and selected diameters are very expensive.

SUMMARY OF THE INVENTION

Accordingly, it is the object of the present invention to provide a novel display element having a plate spacer which combines the good results with respect to the thickness tolerance when using glass fiber pieces as distance limiters with a simple system of an electrical connection between the opposed electrodes.

This and other objects are achieved according to the invention by providing an improved display element wherein precise plate spacing is uniformly achieved around the periphery of the display glass plates and wherein connections between of the electrodes of one plate and the electrodes of the other plate are achieved by an improved spacer formed by electrically conductive fibers, preferably carbon fibers, each having the same constant diameter disposed between the plates around the periphery thereof in the display seal, with the plates separated by conductive fibers which contact opposed electrodes and make electrical connection therebetween.

Further according to the method of the invention, the conductive fibers are admixed to a soft adhesive compound which later hardens to form a cement ridge connecting the plates. The soft admixture is applied to the periphery of at least one of the plates, and the plates are pressed together until separated by a distance determined by the diameter of the conductive fibers, whereupon the spacing admixture is allowed to harden and thereby form the requisite cement ridge.

Carbon fibers can be obtained commercially in practically all the required, exactly defined diameters, for example from Union Carbide Corp., New York. They are cheap, easily cut into short pieces and have very little shear strength. This is a considerable advantage since upon accidentally crossing fibers, one of the two fibers will break under the slightest pressure load. In addition, their electric resistance is small enough to guarantee a good electric connection. At the same time they have a large contact area. They do not interact chemically with adhesives in any way, do not corrode and, as shown in trials, are stable in glass solder at temperatures of above 500° C.

When embedded in cement ridges, they form a diffusion barrier against water diffusing in through the ridge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
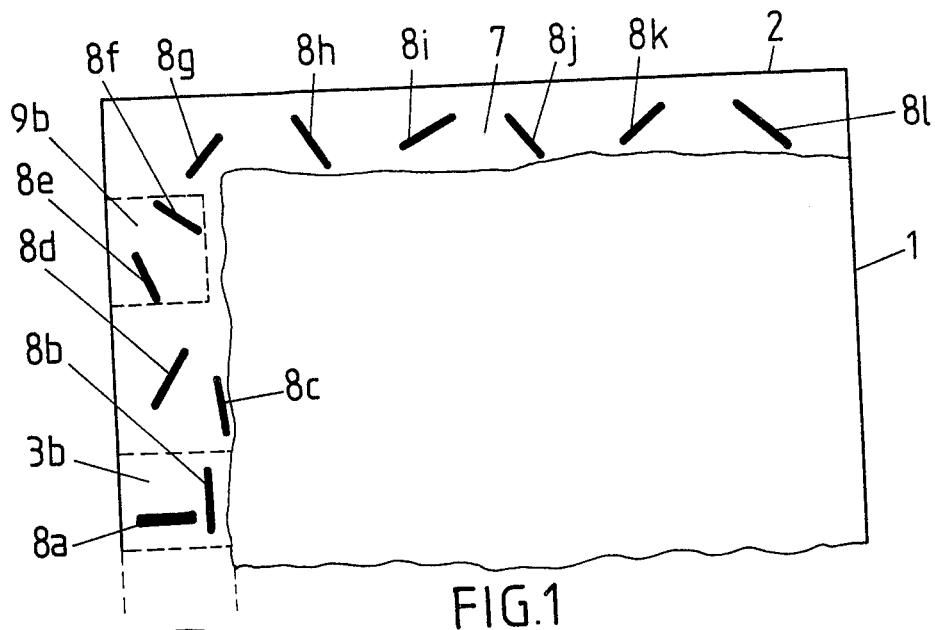
FIG. 1 is a plan view of an example of a display element according to the invention, in which the upper plate is shown broken along its lefthand upper edge for reasons of clarity.

Referring now to the drawings, wherein like reference numerals designate identical or corresponding parts throughout the several views, and more particularly to FIG. 1 thereof, there is seen a top view of a display element produced in accordance with the invention. Initially this display element consists of two plates 1 and 2 which in most cases are made of glass. The lower or rear plate 2 is here shown whole, and the top or front plate 1 is shown partially broken. The electrodes, of which here only the electrode 3b and the connecting electrode 9b are indicated with dashed lines, are very thin transparent conductive layers, generally of a thickness of only a few 100 Å, which are applied to the sides of the plates 1, 2 facing one another. Between the two plates 1 and 2 there is an optically adjustable medium 4, as can be seen from FIG. 3.

In the production of a display element according to the invention pieces of electrically conductive fibers $8a$ to $8l$, all of which have the same exactly defined diameter and an exactly defined electric conductivity, are admixed into the cement ridge 7 connecting the two plates 1,2, for which cement ridge glass solder or another substance suitable as adhesive or sealing compound such as epoxy resin, plastic adhesive, etc., is used, according to the type of the optically adjustable medium 4. The adhesive compound co-mingled with such pieces of electrically conductive fibers $8a$ to $8l$ is applied to the lower plate 2 in a still soft state, for example at the edges. As can be seen from FIG. 1, the individual fibers are resting on the plate 2 in a random distribution and with their longitudinal axes already largely parallel thereto. Any pieces of fibers, which are possibly still crossing others, will break when the upper plate 1 is subsequently pressed onto the lower plate 2.

Figure 2:
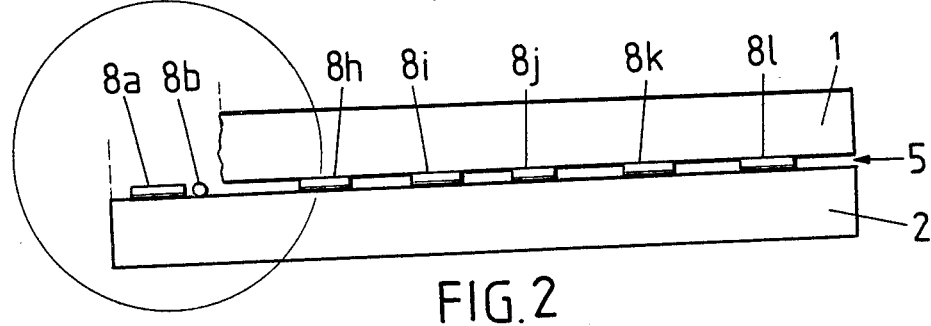
FIG. 2 is a side view corresponding to the example of a display element according to the invention as shown in FIG. 1.

In FIG. 2 the example shown in FIG. 1 of a cell produced in accordance with the invention is represented in lateral section, in a phase in which the upper plate 1 has already been brought towards the lower plate 2 up to the defined minimum separation distance of the plates 1, 2. For reasons of clarity, the fibers $8c$ to $8g$ have not been shown again in FIG. 2. FIG. 2 shows how the spacing effect of the conductive fibers $8a$ to $8l$ also guarantees complete parallelity of the plates with respect to one another, thus guaranteeing a uniform thickness of the optically adjustable medium 4 over the whole intermediate space 5, which is of central importance, for example for the quality of display elements which are using a liquid crystal as the optically adjustable medium 4.

Figure 3:
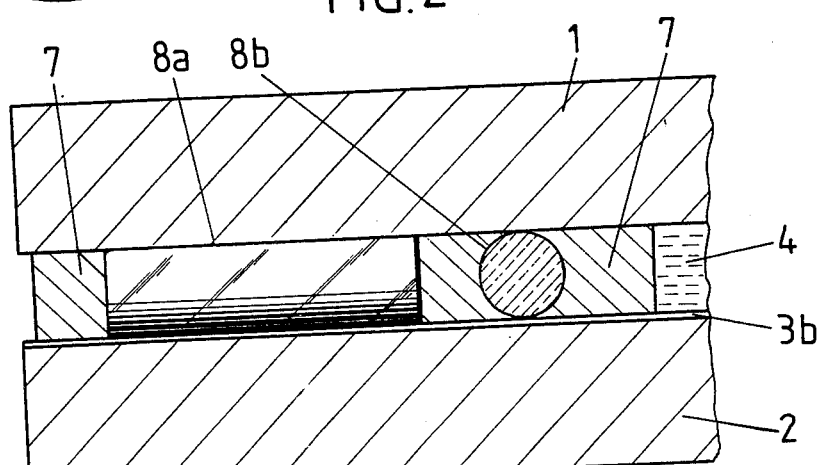
FIG. 3 is an enlarged cross-sectional view of the part of this display element marked in FIG. 2 by means of a circle, the upper plate being drawn out fully here.

In FIG. 3 the section marked in FIG. 2 by means of a circle is shown enlarged. In addition, the electrode 3b applied to the plate 2 as a thin layer is shown in FIG. 3. However, it should be understood that dimensional relationships are not to scale. In particular, the electrode layer 3b is shown much too thick in comparison with the plates 1 and 2. Similarly, the intermediate space 5 for the optically adjustable medium 4 should generally be shown to be much narrower. An example of this is a modern liquid crystal display in which the thickness of the intermediate space 5 for the liquid crystal used as the optically adjustable medium 4 is between 4–50 $\mu$m, the thickness of the electrodes is between 200–1400 Å and the thickness of the plates 1, 2 according to use is between 0.3 and a few millimeters.

Figure 4:
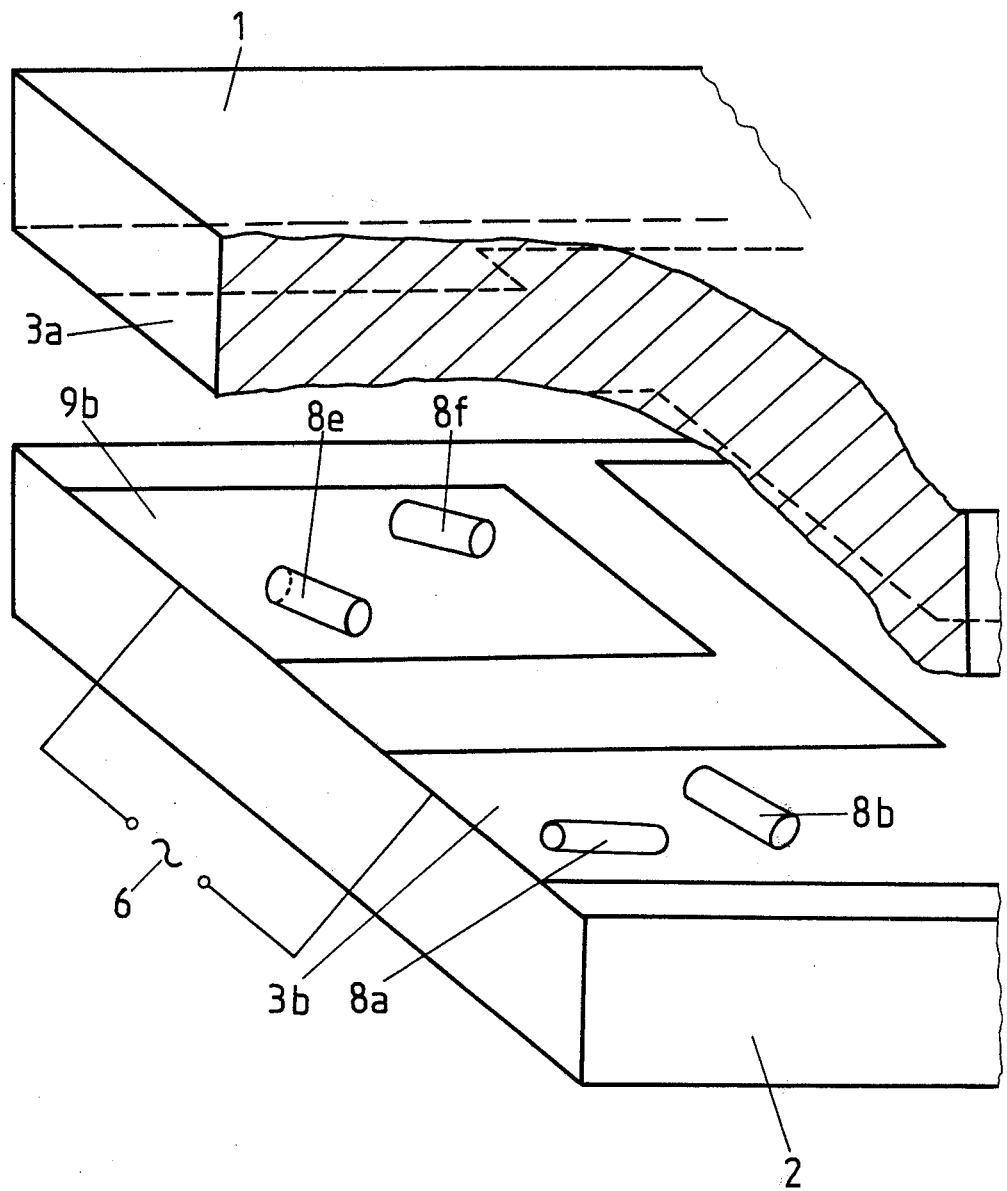
FIG. 4 is an oblique cross-sectional view of a further representation of the display element of the invention, wherein the plates have not as yet been brought to be spaced apart by the nominal distance.

FIG. 4 shows how, in accordance with the present invention, the electrical connection for example between the electrode 3a of the upper plate 1 and the connection electrode 9b of the lower plate 2 is produced, the plates not being shown in FIG. 4 at their nominal spacing, but at a larger distance apart from one another for reasons of clarity. After the plates 1 and 2 have subsequently been pressed against one another to the distance permitted by the diameter of the fibers $8a$, $8b$, $8e$, $8f$, there will be no more adhesive compound, in most cases a glass solder, for example, between the individual fibers $8a$, $8b$ and the electrode $3a$ and the connection electrode $9b$ which are to be connected electrically. Instead, the fibers are then located with their longitudinal axis parallel to the plates in intimate contact with the parts to be connected electrically so that the fibers are capable of forming a good electric contact bridge in accordance with the conductivity of the fibers used. Thus particularly carbon fibers have both a relatively high electric conductivity, that is a very low electric resistance, and a relatively great mechanical and thermal stability so that due to the use of graphite fibers or carbon fibers both the problem of setting an optimum thickness with tight tolerance and the problem of obtaining an electrical connection between the back and front electrode is solved in an optimum manner.

It is to be noted that the invention can also be implemented with other fibers as long as these have an electric conductivity which is adequate for the application concerned, and an adequate mechanical and thermal stability, and are obtainable in the appropriate size and accuracy of diameter.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a display element formed by two plane-parallel plates spaced apart at a predetermined distance from one another by spacers and provided with opposed electrodes on their sides facing one another, a medium in the intermediate space formed by the plates facing one another, which medium can be adjusted in its optical properties by applying a voltage across the electrodes, a cement ridge connecting the two plates around the periphery thereof, and electrically conductive connections from at least one electrode of one plate to at least one electrode of the other plate, the improvement comprising:

said spacers comprising electrically conductive carbon fibers having low shear strength, each having a constant diameter corresponding to the predetermined separation distance of the plates, said conductive fibers disposed between the plates and in said cement ridge around the periphery thereof in contact with the at least one electrode of the one plate and the at least one electrode of the other plate in order to electrically connect these electrodes and to define the interplate spacing by means of the diameter of the conductive fibers.

2. A method for producing a display element formed by two plane-parallel plates spaced apart at a predetermined distance from one another by spacers and provided with opposed electrodes on their sides facing one another, an electro-optically adjustable medium in the intermediate space formed by the plates facing one another, a cement ridge connecting the two plates, an electrically conductive connection from at least one electrode of one plate to at least one opposed electrode of the other plate, comprising:

forming said cement ridge by mixing electrically conductive carbon fibers having low shear strength in an adhesive compound;

applying the mixture of said conductive fibers and said adhesive compound around the periphery of at least one of the plates; and pressing the plates together until the plates are separated by a distance determined by the diameter of the conductive fibers such that each of the conductive fibers contacts each of the display plates, and such that electrical connection between the at least one electrode of the one plate and the at least one electrode of the other plate is made through the conductive fibers disposed therebetween;

whereby in the event that any of said fibers are overlapping prior to said pressing step, said pressing step results in breaking of at least all but one of the overlapping fibers due to the low shear strength thereof to maintain the spacing between the plates as the diameter of said fibers.

* * * * *